Figure 1A:
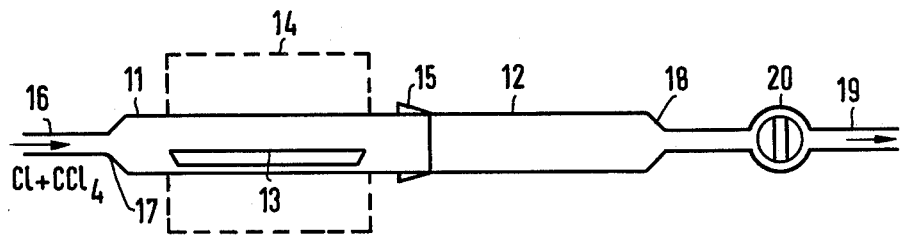

United States Patent [19]

Lins

[11] 3,976,748

[45] Aug. 24, 1976

[54] PROCESS FOR THE PRODUCTION OF $^{238}$PU $^{16}$O$_2$

[75] Inventor: Werner Lins, Aschaffenburg, Germany

[73] Assignee: ALKEM GmbH, Wolfgang near Hanau, Germany

[22] Filed: Sept. 27, 1973

[21] Appl. No.: 401,273

[30] Foreign Application Priority Data

Oct. 9, 1972 Germany............................ 2249424

[52] U.S. Cl. ........................... 423/251; 252/301.1 R
[51] Int. Cl.$^2$ ......................................... C01G 56/00
[58] Field of Search............... 252/301.1 R; 423/251

[56] References Cited
UNITED STATES PATENTS

| | | | |
|---|---|---|---|
| 3,420,640 | 1/1969 | Porter................................ | 423/251 |
| 3,790,440 | 2/1974 | Keshishian.......................... | 423/251 |

*Primary Examiner*—Stephen J. Lechert, Jr.
*Attorney, Agent, or Firm*—Kenyon & Kenyon Reilly Carr & Chapin

[57] ABSTRACT

For use as a power source in heart pacers, plutonium dioxide having a naturally-occurring oxygen isotope composition is converted into solid phase PuCl$_3$ which is subsequently oxidized to form plutonium dioxide of the desired isotope composition by means of water vapor, the oxygen component of which consists essentially of the isotope $^{16}$O. Apparatus suited for this purpose is also described.

3 Claims, 4 Drawing Figures

PROCESS FOR THE PRODUCTION OF $^{238}$PU $^{16}$O$_2$

The present invention relates to a process for the preparation of plutonium 238 dioxide, whose oxygen atoms consist essentially of the isotope $^{16}$O.

Plutonium oxide of such a composition is of great importance as a heat source for biomedical purposes, for instance, for heart pacers. In normal plutonium oxides, the oxygen atoms are composed of the isotopes $^{16}$O, $^{17}$O and $^{18}$O in essentially their naturally-occurring distribution. Such distribution is: 99.7% of $^{16}$O, 0.037% of $^{17}$O and 0.204% of $^{18}$O.

The usable primary energy radiation of plutonium 238 consists of alpha-rays which can be shielded easily. However, if the plutonium is contaminated with light elements or with the oxygen isotopes $^{17}$O and $^{18}$O, this alpha-radiation, due to an ($\alpha$, n) reaction, leads to a high neutron activity, which is difficult to shield.

To prevent this high neutron activity, it is known from German Offenlegungsschrift No. 1,792,435 to treat plutonium dioxide of naturally-occurring oxygen isotope composition with water vapor which is depleted of $^{17}$O and $^{18}$O. This isotope interchange process must be carried out at temperatures between 500° and 800°C. Moreover, it must be carried out in a cascade counter-current process in order to obtain the proper degree of depletion of the undesired oxygen isotopes. It is known that such a process of isotope enrichment requires a large investment in apparatus per unit of enriched product produced thereby, and a long residence time of the plutonium dioxide.

Therefore, it is an object of this invention to provide a new process for the greater enrichment of plutonium dioxide with the isotope $^{16}$O.

It is a further object to provide such a process which requires less costly apparatus per unit of production, and less residence time of the plutonium dioxide.

It is an additional object to furnish a design of apparatus for practicing such process.

Figure 1B:
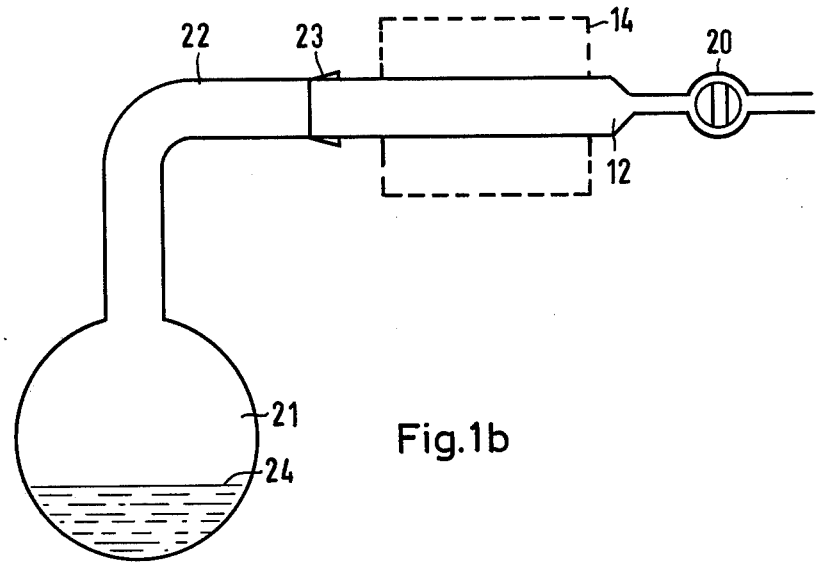
Figure 3:
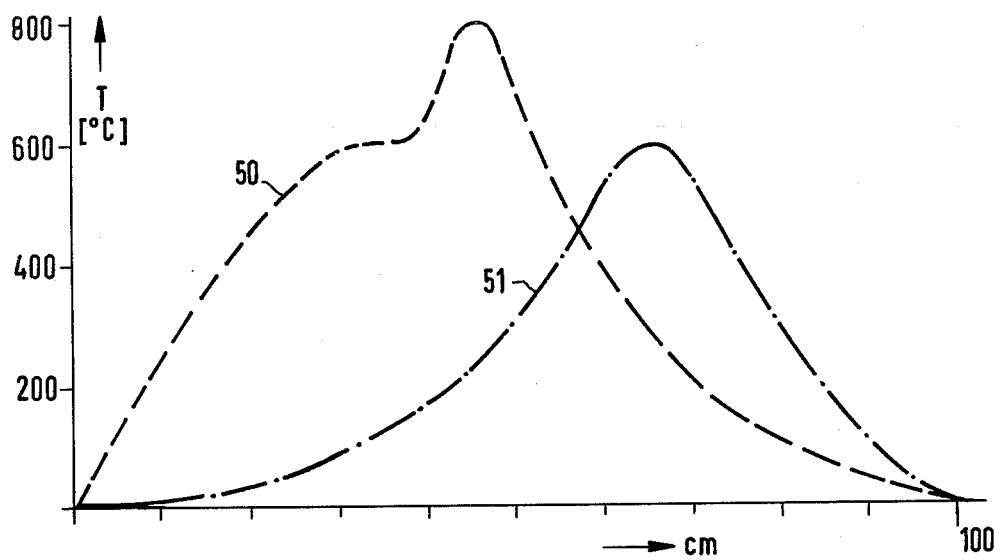
Figure 2:
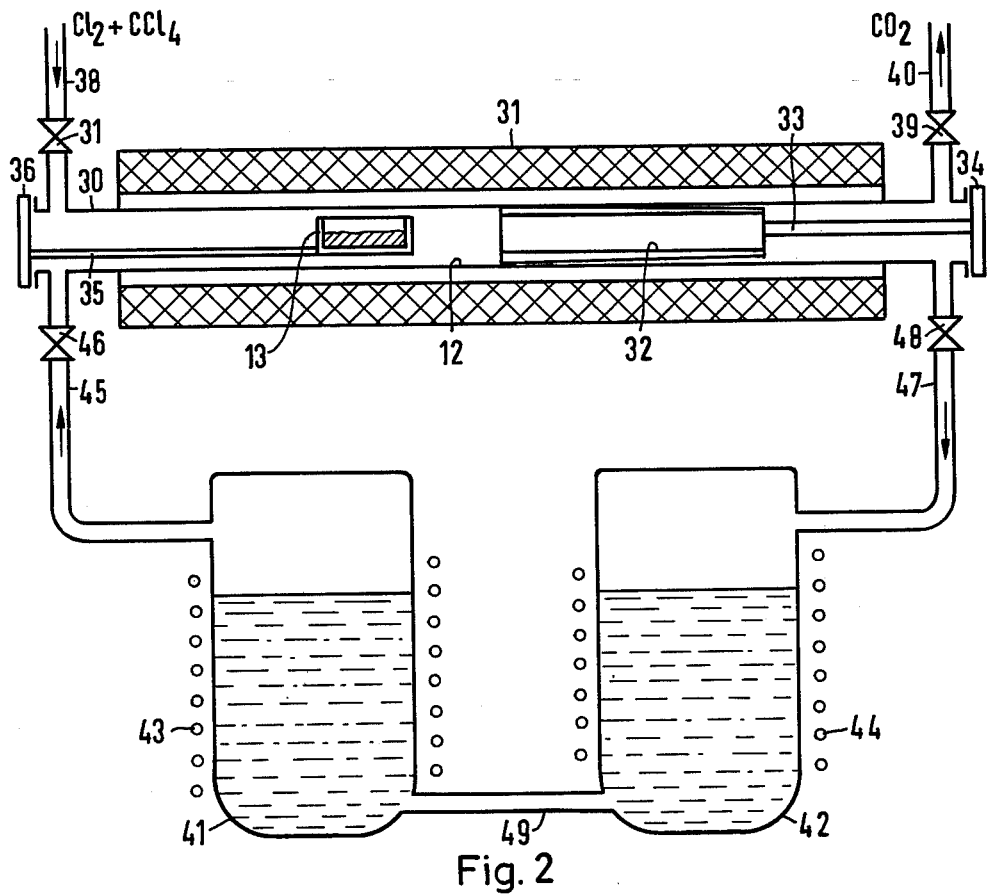

These and other advantages of the invention will be apparent from the following description of the process and the apparatus, in conjunction with the drawings, in which FIGS. 1a and 1b schematically depict suitable laboratory apparatus for practicing the process;

FIG. 2 schematically depicts a more sophisticated apparatus for practicing the process; and FIG. 3 illustrates the temperature profile of the heating means during two steps of the process.

Broadly stated, the process comprises contacting in a reaction zone a feed material comprising plutonium dioxide with a flowing gas capable of reacting the plutonium dioxide to a gaseous chlorinated plutonium reaction product such as plutonium tetrachloride (PuCl$_4$). The temperature during the reaction should be elevated sufficiently to convert the plutonium dioxide to plutonium tetrachloride in the gas phase. Thereafter, the plutonium tetrachloride is transported to a condensing zone and therein condensed to form plutonium trichloride in the solid phase. Next, the solid plutonium trichloride is reacted with water in the gas phase, the oxygen atoms of such water consisting essentially of the isotope having an atomic weight of sixteen, denoted $^{16}$O, thereby producing plutonium dioxide having an enriched $^{16}$O content, i.e., Pu $^{16}$O$_2$.

The plutonium dioxide employed as the feed stock normally will have oxygen atoms comprising the oxygen isotopes ($^{16}$O, $^{17}$O and $^{18}$O) in the proportion, stated above, in which such isotopes normally occur. However, the process of this invention may also employ as a feed stock a plutonium dioxide which has already been partially enriched with one of the oxygen isotopes.

The plutonium is, of course, the $^{238}$Pu isotope.

A suitable reagent for the reaction of the plutonium dixoide feed stock to the tetrachloride is a mixture of chlorine (Cl$_2$) and carbon tetrachloride (CCl$_4$), suitably in a 1:1 molar ratio.

The conversion of the dioxide to the tetrachloride occurs at an elevated temperature, suitably 600°C, according to a process which has been proposed in principle (see German Offenlegangsschrift No. 1,592,413) for the processing of nuclear fuel, and has been employed for the refining of plutonium 238.

The condensation of the plutonium tetrachloride may be performed at temperatures in the range of up to 400°C, e.g. at 200° – 400°C.

The water employed has previously been enriched, by processes already known, to the desired extent with $^{16}$O, advantageously eliminating as much $^{17}$O and $^{18}$O isotopes as possible.

The reaction between the water (H$_2$ $^{16}$O) and the plutonium trichloride proceeds in two stages. The first stage is conducted at a low temperature, advantageously room temperature (20° – 25°C) or slightly above, and at a low water vapor partial pressure in the range of about 0.001 to about 0.1 bar, advantageously about 0.01 bar. This produces Pu $^{16}$O Cl as an intermediate. Thereafter, in the second stage, the reaction temperature is increased to the range of from about 300° to about 600°C, and the partial pressure of the H$_2$ $^{16}$O water is increased to about 1 bar, and the reaction produces the final enriched product $^{238}$Pu $^{16}$O$_2$.

Referring now to FIG. 1a, the apparatus comprises broadly a reaction zone 11, a condensing zone 12, a platinum boat 13 to hold the feed stock PuO$_2$ and a furnace 14. The furnace is preferably adapted to maintain an adjustable temperature profile. The reaction zone 11 and condensing zone 12 are preferably quartz tubes joined at their inner ends by ground glass joint 15. A reactant inlet conduit 16 is connected to the outer end 17 of reaction zone 11. The outer end 18 of condensing zone 12 is connected to a conduit 19 having located therein valve 20.

During the first reaction to create PuCl$_4$, plutonium dioxide feed stock is placed in boat 13. The temperature in the reaction zone 11 is raised to the desired magnitude by means of furnace 14. A mixture of chlorine and carbon tetrachloride is introduced through conduit 16 into reaction zone 11. Any unreacted chlorine and carbon tetrachloride, and the carbon dioxide and the plutonium tetrachloride produced by the reaction pass into condensing zone 12, where the latter is condensed as a solid, and the gas-phase reactants, including chlorinated impurities from the feed stock, pass from the system via conduit 19 and open valve 20.

Referring now to FIG. 1b, additional apparatus is provided comprising a first vessel 21 connected by a passageway 22 and ground-glass joint 23 to condensing zone 12. Aqueous sodium hydroxide solution 24 is in vessel 21. The oxygen atoms of the water of such solution consist essentially of $^{16}$O. Furnace 14 has been re-located to control the temperature in condensing zone 12.

In operation, after the apparatus of FIG. 1a has cooled sufficiently to handle, the apparatus of FIG. 1b is assembled. The aqueous hydroxide solution is heated by means of a heating device (not shown) to establish and maintain the desired water partial pressure (in the range of about 0.001 to about 0.1 bar) in condensing zone 12, while such zone is maintained at about room temperature. The $PuCl_3$ adhering in solid form to the walls of the condensing zone is oxidized to $Pu^{16}OCl$. The reaction is often complete in an hour. The HCl produced as a by-product reacts with the hydroxide solution, forming NaCl and water.

Thereafter, the temperature of the hydroxide solution 24 is increased sufficiently to furnish a partial pressure of water vapor in the condensing zone of about 1 bar, while the temperature of said zone is increased by means of furnace 14 to a range sufficient to convert the $Pu^{16}OCl$ to $Pu^{16}O_2$. A reaction time of about one hour is ordinarily sufficient for this stage of the process. Any residual chlorine that may remain may be driven out by a further increase of the temperature.

The apparatus can be operated as long as a sufficient quantity of sodium hydroxide is still present for neutralizing the HCl gas formed. The spent sodium hydroxide is then replaced after the NaCl is removed.

Broadly stated, a more sophisticated embodiment of the apparatus comprises a reaction zone having an outer end and an inner end; a condensing zone having an outer end and an inner end and a temperature control heating means adapted to establish and maintain different predetermined temperature profiles through each of said zones along the axes connecting their respective outer and inner ends. Reactant inlet means are provided, adapted to permit the introduction of at least one fluid reactant into the outer end of the reaction zone. The outer end of the condensing zone is provided with means adapted to discharge fluids from such zone. The inner ends of the two zones are connected to each other, permitting fluids to flow from one zone to the other.

The temperature control means is adapted to maintain an elevated temperature in the reaction zone, advantageously not less than about 600°C, sufficient to permit the reaction of plutonium dioxide with carbon tetrachloride and chloride to form plutonium tetrachloride, and is further adapted concurrently to maintain in the condensing zone an intermediate-range elevated temperature sufficient, advantageously in the range of about 200° to about 400°C, to condense in such zone plutonium trichloride but above the condensing temperatures of other non-plutonium-containing reaction products and unreacted fluid products. The temperature control means is also adapted to maintain (of course, at a different point in time), the condensing zone at an elevated temperature, up to about 600°C, sufficient to react plutonium trichloride with water vapor to form plutonium dioxide, while concurrently maintaining the reaction zone at a lower temperature.

The apparatus preferably is adapted to operate at pressures in the range of from about 0.001 to about 1 bar.

In a preferred embodiment, the apparatus comprises a first and a second vessel each adapted to contain a supply of water or an aqueous solution. The first vessel is connected to the outer end of the reaction zone while the second vessel is connected to the outer end of the condensing zone. The first vessel is equipped with first vessel heating means adapted to heat an aqueous fluid contained therein to a pre-determined temperature, whereby the water vapor pressure in the first vessel is maintained at a pre-determined pressure.

The apparatus may also comprise second vessel heating means adapted to heat an aqueous liquid contained in the second vessel to a pre-determined temperature less than the temperature of a liquid in the first vessel, whereby the flow of gases in the apparatus is sequentially from the first vessel, through the reaction zone into the condensation zone and to the second vessel.

Referring now to FIGS. 2 and 3, illustrating a preferred embodiment of the apparatus, a long quartz tube 30, of about 5 cm. diameter by 100 cm. length, is enveloped by a segmented furnace 31. A cylindrical condenser sleeve 32 is sliably inserted into tube 30 and is provided with a gas-tight fit at its left-hand end. Condenser sleeve 32 is mounted on an arm 33 and a plug 34, which serves to seal the right-hand end of tube 30.

Condensing sleeve 32 is removable to permit removing and collcting the product plutonium dioxide. The sleeve may be made of quartz or platinum.

The platinum boat 13 is mounted on arm 35 and plug 36, which seals the opposite end of tube 30.

Condensing sleeve 32 comprises the condensing zone. The reaction zone comprises the portion of tube 30 enveloped by furnace 31 and to the left of sleeve 32.

Conduit 38 and valve 37 serve as the reactant inlet means, permitting the introduction of reagents such as chlorine and carbon tetrachloride. Conduit 40 and valve 39 permit the withdrawal of fluid reaction products and unreacted reagents.

First vessel 41 and second vessel 42 are provided with heating devices 43 and 44, respectively. First vessel 41 is connected to the outer end of the reaction zone section of tube 30 in a conduit 45 and valve 46. Second vessel 43 is connected to the outer end of the condensing zone section of tube 30 in a conduit 47 and valve 48. Vessels 41 and 43 are connected by conduit 49.

Furnace 31 is constructed in multiple segments, not shown, in order to maintain the desired pre-determined temperature profiles along the axes of the reaction and condensing zones. Curve 50 of FIG. 3 illustrates the temperature profiles during the reaction of plutonium dioxide to form plutonium tetrachloride. Curve 51 illustrates the profiles during the second state of the reaction with water vapor to convert plutonium trichloride back to plutonium dioxide.

To carry out the process, furnace 31 is adjusted to achieve the temperature profile of curve 50. Valves 37 and 39 are opened and the valves 46 and 48 are closed. Chlorine and $CCl_4$ are then admitted via conduit 38. Plutonium dioxide with naturally-occurring oxygen isotope composition located in boat 13 is thereby converted into $PuCl_4$. The exhaust gases escape through conduit 40, which is connected in a manner not shown to a filter system for the impurities and a gas recovery system. After a period of about 1 hour valves 37 and 39 are closed and, after the reaction zone has cooled down, the boat 13 is taken out by removing plug 36. Tube 30 is then closed again, valves 37 and 39 are closed and valves 46 and 48 are opened. A partial water vapor pressure of about 0.01 bar is now adjusted by means of the heating devices 43 and 44. The temperature in the vessel 43 is kept somewhat lower than that in the vessel 41, so that circulation of the vapor formed in the vessel 41 via the condenser sleeve 32 can take place. The water vapor arriving in the vessel 42 via the line 47 is condensed there, and the HCl gas taken along is at the same time neutralized there by an aqueous sodium hydroxide solution in vessel 42.

Subsequently, the temperature profile of curve 51 is achieved by means of the furnace 31 and the oxidiation of the $PuCl_3$ originally present in the condenser sleeve 32 to $PuO_2$ is completed.

The amount of plutonium dioxide originally placed into boat 13 is about 50 grams; the volume of the water placed in the vessels 41 and 42 is about 100 ml. These vessels can, of course, also be connected with supply tanks for $H_2{}^{16}O$ and $Na^{16}OH$, respectively, in a manner not shown here. The NaCl, which is formed during the second stage of operation, can be removed from the circuit by replaceable and cooled inserts (not shown), at which the dissolved NaCl crystallizes out.

In contrast to the already mentioned state of the art, a yield of practically 100% of the oxygen isotope $^{16}O$ is obtained in the product plutonium dioxide by this method. This degree of purity depends expressly on the degree of enrichment with this oxygen isotope of the water employed in vessel 41. There is no loss of this valuable water during the reaction or depletion of the oxygen isotope contained therein. The product plutonium dioxide can be taken from the condenser sleeve 32 in extremely pure form and is then available without any further purification measures for further processing as a power source, for instance, for heart pacers.

Having thus described the invention, what is claimed is:

1. A process for manufacturing $^{238}Pu^{16}O_2$ which process comprises contacting plutonium dioxide with a flowing mixture of chloride and carbon tetrachloride at about 600°C to form a gaseous chlorinated plutonium reaction product, said plutonium dioxide containing $^{17}O$, $^{18}O$ oxygen atoms in proportion to $^{16}O$ atoms of at least half the naturally-occurring ratio of $^{17}O$, $^{18}O$ atoms to $^{16}O$ atoms, condensing said reaction product to solid phase plutonium trichloride; and oxidizing said solid phase plutonium trichloride by reaction with water in the vapor phase, the oxygen atoms of said water consisting essentially of $^{16}O$.

2. The process of claim 1 wherein said oxidizing step is conducted initially at a low temperature and at a water vapor pressure in the range of about 0.001 to about 0.1 bar, and completing the oxidizing step at a temperature in the range of about 300 to about 600°C and at a water vapor pressure of about 1 bar.

3. The process of claim 1 wherein said oxidizing of plutonium trichloride with water produces hydrogen chloride as a by-product and said hydrogen chloride is removed by reaction with an aqueous alkali solution.

* * * * *

UNITED STATES PATENT AND TRADEMARK OFFICE
CERTIFICATE OF CORRECTION

PATENT NO. : 3976748
DATED : AUGUST 24, 1976
INVENTOR(S) : WERNER LINS

It is certified that error appears in the above-identified patent and that said Letters Patent are hereby corrected as shown below:

Col. 3, line 44: delete "chloride" and insert instead --chlorine--;

Col. 4, line 19: delete "collcting" and insert instead --collecting--;

Signed and Sealed this

Twelfth Day of April 1977

[SEAL]

Attest:

RUTH C. MASON
*Attesting Officer*

C. MARSHALL DANN
*Commissioner of Patents and Trademarks*